United States Patent
Qin et al.

(10) Patent No.: US 12,425,067 B2
(45) Date of Patent: Sep. 23, 2025

(54) RADIO TRANSMITTER AS WELL AS METHOD AND CONTROLLER THEREFOR

(71) Applicant: Telefonaktiebolaget LM Ericsson (publ), Stockholm (SE)

(72) Inventors: Ling Qin, Chengdu (CN); Rui Hou, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 357 days.

(21) Appl. No.: 18/029,795

(22) PCT Filed: Oct. 2, 2020

(86) PCT No.: PCT/CN2020/119789
§ 371 (c)(1),
(2) Date: Mar. 31, 2023

(87) PCT Pub. No.: WO2022/067855
PCT Pub. Date: Apr. 7, 2022

(65) Prior Publication Data
US 2023/0370110 A1    Nov. 16, 2023

(51) Int. Cl.
*H04B 1/525* (2015.01)
*H04B 1/04* (2006.01)

(52) U.S. Cl.
CPC ..... *H04B 1/525* (2013.01); *H04B 2001/0408* (2013.01)

(58) Field of Classification Search
CPC .......... H04B 1/02; H04B 1/04; H04B 1/0408; H04B 1/0458; H04B 1/0475; H04B 1/40;
(Continued)

(56) References Cited

U.S. PATENT DOCUMENTS

| | | | | |
|---|---|---|---|---|
| 7,373,115 | B2 * | 5/2008 | Monroe | H04B 1/48 455/82 |
| 8,331,388 | B2 * | 12/2012 | Kodim | H04B 1/0458 370/419 |

(Continued)

FOREIGN PATENT DOCUMENTS

| | | |
|---|---|---|
| CN | 101465665 A | 6/2009 |
| CN | 105099493 A | 11/2015 |
| WO | 2001/015362 A1 | 3/2001 |

OTHER PUBLICATIONS

Dastjerdi, M. B. et al., "Full Duplex Circulator-Receiver Phased Array Employing Self-Interference Cancellation via Beamforming", RMO3A-2, 2018 IEEE Radio Frequency Integrated Circuits Symposium (4 pages).
(Continued)

*Primary Examiner* — Quochien B Vuong
(74) *Attorney, Agent, or Firm* — Rothwell, Figg, Ernst & Manbeck, P.C.

(57) ABSTRACT

A radio transmitter as well as a method and a controller therefor are disclosed. According to an embodiment, the radio transmitter comprises a power amplifier, a filter unit, a circulator, a switch and a reflection cancellation unit. The filter unit is capable of filtering an output from the power amplifier during a downlink time division duplex (TDD) slot and filtering an uplink signal during an uplink TDD slot. The circulator has a first port coupled to the power amplifier, a second port coupled to the filter unit, and a third port coupled to the switch. The switch is capable of coupling the third port of the circulator to a termination load during the downlink TDD slot and coupling the third port of the circulator to an uplink reception path during the uplink TDD slot. The reflection cancellation unit is coupled between the switch and the termination load and is capable of generating a first reflection signal that propagates to the first port of the
(Continued)

circulator via the switch and the third port of the circulator during the downlink TDD slot.

20 Claims, 12 Drawing Sheets

(58) Field of Classification Search
CPC ... H04B 1/44; H04B 1/525; H04B 2001/0408
See application file for complete search history.

(56) References Cited

U.S. PATENT DOCUMENTS

| | | |
|---|---|---|
| 10,298,349 B2 * | 5/2019 | Gao .................. H04B 1/525 |
| 2005/0255812 A1 | 11/2005 | Na et al. |
| 2014/0050114 A1 | 2/2014 | Gao et al. |
| 2015/0215887 A1 | 7/2015 | Nejatian et al. |
| 2017/0019272 A1 | 1/2017 | Brannon et al. |
| 2018/0270006 A1 | 9/2018 | Gao et al. |
| 2019/0182019 A1 * | 6/2019 | Tadano ............... H04B 1/0475 |

OTHER PUBLICATIONS

International Search Report and Written Opinion with Transmittal dated Jul. 1, 2021 issued in International Patent Application No. PCT/CN2020/119789 (10 pages).
Pozar, D. M., "Microwave Engineering", Fourth Edition, 2012, John Wiley & Sons, Inc. (756 pages).

* cited by examiner

RADIO TRANSMITTER AS WELL AS METHOD AND CONTROLLER THEREFOR

CROSS REFERENCE TO RELATED APPLICATIONS

This application is a 35 U.S.C. § 371 National Stage of International Patent Application No. PCT/CN2020/119789, filed 2020 Oct. 2.

TECHNICAL FIELD

Embodiments of the disclosure generally relate to communication, and, more particularly, to a radio transmitter as well as a method and a controller therefor.

BACKGROUND

This section introduces aspects that may facilitate better understanding of the present disclosure. Accordingly, the statements of this section are to be read in this light and are not to be understood as admissions about what is in the prior art or what is not in the prior art.

Efficiency is one of the most important parameters of a power amplifier (PA) in a base station, since it determines the power consumption as well as the cooling requirement of the base station. To achieve better efficiency, a PA generally works closely to saturation, which means poor linearity. To meet spurious emission limit, linearization technique is often necessary. Currently, digital pre-distortion (DPD) is one of the most widely used linearization techniques. It captures data from the PA output, and constructs an inverse model of the PA to pre-distort the baseband signal before sending it to the PA. Thus the whole transmitter (TX) link is linearized. With the help of DPD, a PA can work with higher efficiency, while still having good linearity.

To construct the inverse model of the PA, the feedback from the PA output is observed. This signal is a copy of the PA output signal with a much smaller amplitude. So it has negligible influence on the PA's performance while still containing all the nonlinearity information of the PA. By minimizing the difference between the feedback signal and the original baseband signal, the inverse model of the PA can be constructed. So, the accuracy of the feedback signal is important for DPD. However, any interference on the feedback signal will impact the nonlinear behavior of the PA 'seen' by DPD, thus making the construction of the PA's inverse model inaccuracy and deteriorating the linearization performance.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved radio transmitter. In particular, one of the problems to be solved by the disclosure is that the traditional PA backend in a time division duplex (TDD) system may have a poor isolation performance.

According to a first aspect of the disclosure, there is provided a radio transmitter. The radio transmitter may comprise a power amplifier, a filter unit, a circulator, a switch and a reflection cancellation unit. The filter unit may be capable of filtering an output from the power amplifier during a downlink TDD slot and filtering an uplink signal during an uplink TDD slot. The circulator may have a first port coupled to the power amplifier, a second port coupled to the filter unit, and a third port coupled to a switch. The switch may be capable of coupling the third port of the circulator to a termination load during the downlink TDD slot and coupling the third port of the circulator to an uplink reception path during the uplink TDD slot. The reflection cancellation unit may be coupled between the switch and the termination load and be capable of generating a first reflection signal that propagates to the first port of the circulator via the switch and the third port of the circulator during the downlink TDD slot.

In this way, it is possible to improve the isolation for the backend of the PA.

In an embodiment of the disclosure, at the first port of the circulator, the first reflection signal may be added to a sum of reflection signals in order to offset the sum of reflection signals at the first port of the circulator.

In an embodiment of the disclosure, the reflection signals offset by the first reflection signal may comprise: a second reflection signal leaked from the second port to the first port of the circulator; a third reflection signal that is generated by the switch and propagates to the first port via the third port of the circulator; and a fourth reflection signal that is generated by the first port of the circulator and propagates backward to the power amplifier.

In an embodiment of the disclosure, the reflection cancellation unit may be a passive impedance network of predetermined component values.

In an embodiment of the disclosure, the reflection cancellation unit may comprise an impedance tuner.

In an embodiment of the disclosure, the impedance tuner may be one of: a single-stub impedance tuner; a multi-stub impedance tuner; and a coupler based impedance tuner which is formed with a hybrid coupler and tunable element (s).

In an embodiment of the disclosure, one or more tunable elements in the single-stub impedance tuner or the multi-stub impedance tuner or the coupler based impedance tuner may comprise at least one of: a variable capacitor; a variable resistor; a varactor; and a micro-electro-mechanical system (MEMS) switch.

In an embodiment of the disclosure, the reflection cancellation unit may further comprise a controller configured to control the impedance tuner to minimize a total reflection at the first port of the circulator.

In an embodiment of the disclosure, the reflection cancellation unit may further comprise a temperature sensor configured to sense ambient temperature of the radio transmitter. The controller may be configured to control the impedance tuner based on the sensed ambient temperature.

In an embodiment of the disclosure, the impedance tuner may be controlled by using a preconfigured look-up table indicating correspondences between control values for the impedance tuner and temperatures.

In an embodiment of the disclosure, the reflection cancellation unit may further comprise a power meter that is coupled between the first port of the circulator and the power amplifier and configured to measure a power of the total reflection at the first port of the circulator. The controller may be configured to control the impedance tuner to minimize the measured power of the total reflection.

In an embodiment of the disclosure, the radio transmitter may further comprise a directional coupler coupled between the power amplifier and the first port of the circulator, and a feedback receiver coupled to the directional coupler and configured to feed a portion of the output from the power amplifier back for digital pre-distortion.

In an embodiment of the disclosure, the reflection cancellation unit may further comprise a controller configured to control the impedance tuner to optimize a linearization performance of the power amplifier monitored by the feedback receiver.

In an embodiment of the disclosure, the linearization performance of the power amplifier may be represented by at least one of: adjacent channel leakage ratio (ACLR); and error vector magnitude (EVM).

In an embodiment of the disclosure, the impedance tuner may be controlled by using one of: a gradient decent process; a Levenberg Marquardt process; a Gauss-Newton process; and a simultaneous perturbation stochastic approximation (SPSA) process.

In an embodiment of the disclosure, the radio transmitter may further comprise an antenna unit coupled to the filter unit.

According to a second aspect of the disclosure, there is provided a radio device comprising the radio transmitter according to the above first aspect.

In an embodiment of the disclosure, the radio device may be one of: a remote radio unit (RRU); a distributed unit (DU); an active antenna system (AAS); and a base station.

According to a third aspect of the disclosure, there is provided a method performed by a controller in a radio transmitter. The radio transmitter may comprise a power amplifier, a filter unit, a circulator, a switch and an impedance tuner. The circulator may have a first port coupled to the power amplifier, a second port coupled to the filter unit, and a third port coupled to the switch. The switch may be capable of coupling the third port of the circulator to a termination load during a downlink TDD slot and coupling the third port of the circulator to an uplink reception path during an uplink TDD slot. The impedance tuner may be coupled between the switch and the termination load and be capable of generating a first reflection signal that propagates to the first port of the circulator via the switch and the third port of the circulator during the downlink TDD slot. The method may comprise obtaining a metric that can reflect a strength of a total reflection at the first port of the circulator in a case where at least one first control value is used to control the impedance tuner. The method may further comprise determining at least one second control value for the impedance tuner based on the obtained metric such that the strength of the total reflection at the first port of the circulator is minimized. The method may further comprise controlling the impedance tuner with the at least one second control value.

In an embodiment of the disclosure, the metric may be one of: a power of the total reflection at the first port of the circulator; ACLR; and EVM.

In an embodiment of the disclosure, the at least one second control value may be determined by using one of: a gradient decent process; a Levenberg Marquardt process; a Gauss-Newton process; and a simultaneous perturbation stochastic approximation (SPSA) process.

According to a fourth aspect of the disclosure, there is provided a controller in a radio transmitter. The radio transmitter may comprise a power amplifier, a filter unit, a circulator, a switch and an impedance tuner. The circulator may have a first port coupled to the power amplifier, a second port coupled to the filter unit, and a third port coupled to the switch. The switch may be capable of coupling the third port of the circulator to a termination load during a downlink TDD slot and coupling the third port of the circulator to an uplink reception path during an uplink TDD slot. The impedance tuner may be coupled between the switch and the termination load and be capable of generating a first reflection signal that propagates to the first port of the circulator via the switch and the third port of the circulator during the downlink TDD slot. The controller may comprise at least one processor and at least one memory. The at least one memory may contain instructions executable by the at least one processor, whereby the controller may be operative to obtain a metric that can reflect a strength of a total reflection at the first port of the circulator in a case where at least one first control value is used to control the impedance tuner. The controller may be further operative to determine at least one second control value for the impedance tuner based on the obtained metric such that the strength of the total reflection at the first port of the circulator is minimized. The controller may be further operative to control the impedance tuner with the at least second control value.

In an embodiment of the disclosure, the controller may be operative to perform the method according to the above third aspect.

According to a fifth aspect of the disclosure, there is provided a computer program product. The computer program product may comprise instructions which when executed by at least one processor, cause the at least one processor to perform the method according to the above third aspect.

According to an sixth aspect of the disclosure, there is provided a computer readable storage medium. The computer readable storage medium may comprise instructions which when executed by at least one processor, cause the at least one processor to perform the method according to the above third aspect.

According to a seventh aspect of the disclosure, there is provided a controller in a radio transmitter. The radio transmitter may comprise a power amplifier, a filter unit, a circulator, a switch and an impedance tuner. The circulator may have a first port coupled to the power amplifier, a second port coupled to the filter unit, and a third port coupled to the switch. The switch may be capable of coupling the third port of the circulator to a termination load during a downlink TDD slot and coupling the third port of the circulator to an uplink reception path during an uplink TDD slot. The impedance tuner may be coupled between the switch and the termination load and be capable of generating a first reflection signal that propagates to the first port of the circulator via the switch and the third port of the circulator during the downlink TDD slot. The controller may comprise an obtaining module for obtaining a metric that can reflect a strength of a total reflection at the first port of the circulator in a case where at least one first control value is used to control the impedance tuner. The controller may further comprise a determination module for determining at least one second control value for the impedance tuner based on the obtained metric such that the strength of the total reflection at the first port of the circulator is minimized. The controller may further comprise a controlling module for controlling the impedance tuner with the at least one second control value.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
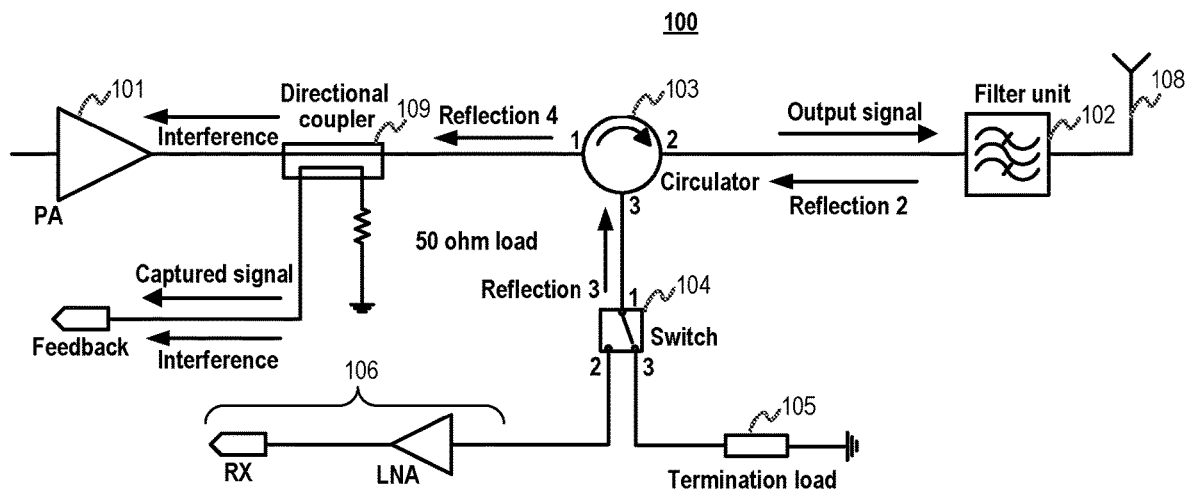
FIG. 1 is a diagram illustrating a traditional radio transmitter.

As described above, any interference on the feedback signal will impact the nonlinear behavior of the PA 'seen' by DPD, thus making the construction of the PA's inverse model inaccuracy and deteriorating the linearization performance. The inventors found that one of the major interferences is the reflection power at PA backend, especially in TDD system. FIG. 1 illustrates a traditional radio transmitter for explaining the PA backend structure of a TDD system. As shown, the radio transmitter 100 includes a PA 101 (e.g. a Doherty PA), a directional coupler 109 (to capture data for DPD), a circulator 103, a switch 104 (e.g. a high power (HP) switch), a filter unit (FU) 102, and an antenna unit 108. The major difference between a TDD and a frequency division duplex (FDD) system in the PA backend is that the circulator 103 is replaced by an isolator in the FDD system. In the TDD system, at uplink timeslot, the HP switch 104 switches the antenna output to an uplink reception path 106 containing a low noise amplifier (LNA) and the received signal transmits through the circulator 103 to the LNA. At downlink timeslot, it switches to a termination load 105 (e.g. a high power load) to absorb the reflections from the FU 102.

Since the FU has full reflection outside of the working band, the reflection always exists, especially for the signal with spectrum outside of working band, which is known as the spectrum expansion caused by PA nonlinearity. This reflected signal, if not isolated from the PA, will have a big impact on the system linearization performance from two aspects. Firstly, when it goes to the PA output, it will modulate the PA output signal, producing new intermodulation that is hard to be corrected by DPD. The stronger nonlinearity the PA has, the stronger intermodulation it would produce. Secondly, it will be reflected again from the PA output, since a PA output often has poor return loss. Then it will go into the feedback path and become interference to the DPD. This could strongly impact DPD modeling. Therefore, isolation of this reflection from the PA output is important for system linearity.

In an FDD system, the isolation performance of an isolator is often good, for example, better than 20 dB. However, in a TDD system, the isolation could be a problem, due to two reasons. Firstly, for downlink/uplink (DL/UL) multiplexing, the third port of the circulator needs to be connected to a HP switch. So at downlink, the switch switches to a load and most of the reflections are absorbed at the load. Ideally, the HP switch presents to the circulator as being perfectly matched, i.e. there is no reflection at its input. However, in reality, the reflection at this HP switch is never zero. Sometimes, its return loss is far from 'good'. If so, the reflected signal at the input of the HP switch will feed directly to the PA output, through the circulator. This lack of isolation causes interference. Secondly, the reverse signals can add up at the input of the circulator (port 1) and make the isolation even worse, as described below.

Figure 2:
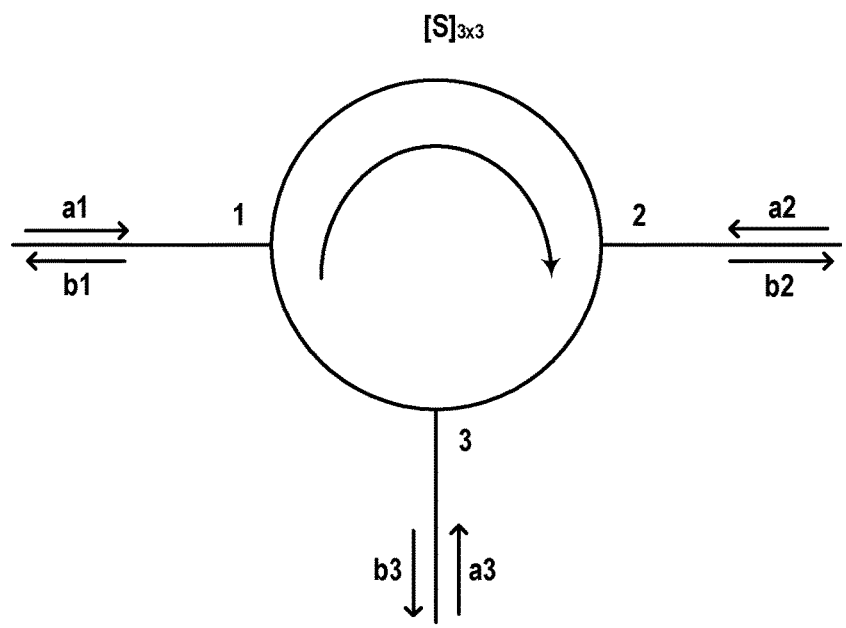
FIG. 2 is a diagram illustrating a circulator.

FIG. 2 illustrates a circulator. As shown, the circulator can be characterized by a 3-port scattering matrix and the input signal $(a_1, a_2, a_3)$/output signal $(b_1, b_2, b_3)$ is related by:

$$\begin{pmatrix} b_1 \\ b_2 \\ b_3 \end{pmatrix} = \begin{pmatrix} S_{11} & S_{12} & S_{13} \\ S_{21} & S_{22} & S_{23} \\ S_{31} & S_{32} & S_{33} \end{pmatrix} \begin{pmatrix} a_1 \\ a_2 \\ a_3 \end{pmatrix}. \quad \text{(eq. 1)}$$

Here, it is assumed that port 1 is connected to the PA output, port 2 is connected to the FU, and port 3 is connected to the HP switch toggling between the LNA and the load, which is the same as the connections shown in FIG. 1. Suppose that there is a reflection signal (or backward wave) $a_2$ going towards port 2 (one possible source of $a_2$ is the reflection from the FU). Then, the reflection 'seen' by the PA is $b_1$, which can be expressed as:

$$b_1 = S_{11}*a_1 + S_{12}*a_2 + S_{13}*a_3 = S_{12}*a_2 + S_{13}*a_3, \quad \text{(eq.2)}$$

where $a_3$ is the reflected signal from the HP switch. If the return loss at the switch input is defined as $\Gamma$, then $a_3$ is expressed as:

$$a_3 = \Gamma * b_3 = \Gamma * (S_{32}*a_2 + S_{33}*a_3) \quad \text{(eq. 3)}$$

$$a_3 = \frac{\Gamma * S_{32}}{1 - \Gamma * S_{33}} * a_2.$$

By substituting equation 3 into equation 2, the relation between $b_1$ and $a_2$ can be obtained as below, where $b_1/a_2$ is the so-called isolation.

$$b_1 = \left(S_{12} + \frac{\Gamma * S_{13} * S_{32}}{1 - \Gamma * S_{33}}\right) * a_2. \quad \text{(eq. 4)}$$

For a real device, $|S_{21}|=|S_{13}|=|S_{32}|$ is the insertion loss of the circulator and is close to 1 (0 dB), while $S_{mn}$ (n=1,2,3) is the return loss of each port and is often quite good (~−20 dB). So, it is reasonable to assume that $S_{13}=S_{32}=e^{j\varphi_1}$ ($\varphi_1$ is the phase shift of the signal going through the circulator) and $S_{33}=0$. Then, an approximate expression can be obtained as below:

$$b_1 = (S_{12} + \Gamma * e^{2j\varphi_1}) * a_2. \quad \text{(eq. 5)}$$

This equation reveals that the signal reflected to the PA consists of two parts. The first part, $S_{12}*a_2$, is related to the isolation of the circulator itself, where its magnitude can be about −20 dB for a real device. The second part comes from the reflection at the HP switch, as described previously. Since the phase relation between the two parts is not under full control, inevitably, in some situation, the phase of the two can be close to each other. After they add in-phase, a much higher reflection is produced. For example, assume that the return loss at the HP switch input is −18 dB, while the isolation of the circulator is −22 dB. Then, if the two add in-phase, a total reflection of −13.7 dB is 'seen' by the PA, which can significantly impact the system linearity. This indicates that only focusing on the matching of the HP switch itself is not enough to avoid bad isolation.

The present disclosure proposes an improved solution for a radio transmitter, a controller for the radio transmitter, a method performed by the controller, and a radio device including the radio transmitter. Hereinafter, the solution will be described in detail with reference to FIGS. 3-19.

Figure 3:
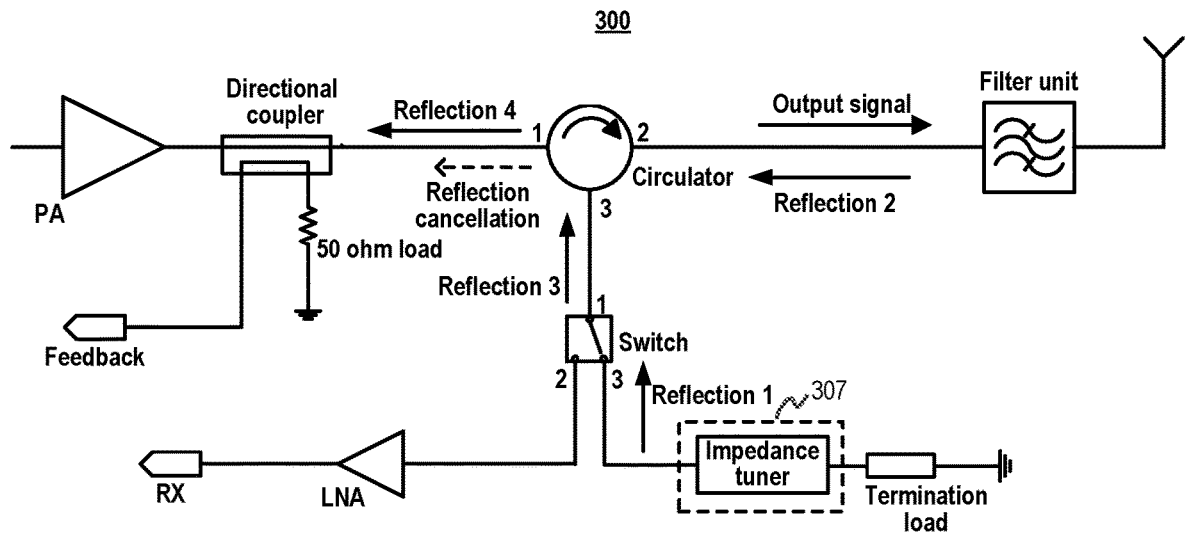
FIG. 3 is a diagram illustrating a radio transmitter according to an embodiment of the disclosure.

FIG. 3 is a diagram illustrating a radio transmitter according to an embodiment of the disclosure. As shown, compared with the traditional radio transmitter 100 shown in FIG. 1, an impedance tuner 307 is additionally provided in the radio transmitter 300. The impedance tuner 307 is coupled between the switch 104 and the termination load 105 and is capable of generating a first reflection signal that propagates to the first port of the circulator 103 via the switch 104 and the third port of the circulator 103 during a downlink TDD slot. Due to the introduction of the impedance tuner 307, it is possible to improve the isolation for the backend of the PA.

For example, at the first port of the circulator 103, the first reflection signal is added to a sum of reflection signals in order to offset the sum of reflection signals. This means that at the first port of the circulator 103, the first reflection signal cancels a sum of reflection signals which would be caused in a case where the impedance tuner 307 was not provided in the radio transmitter 300. In this way, the isolation risk in a TDD system can be largely lowered. Note that the expression "being cancelled" used here may cover "being completely cancelled" and "being partly cancelled" and thus can be interchangeably used with "being offset" in the present disclosure. The specific analysis will be provided as below.

As shown in FIG. 3, by adding the impedance tuner 307 between the switch 104 and the termination load 105, an intentional reflection is produced at the impedance tuner 307, whose phase and magnitude can be controlled. Thus, one more source of reflection is seen by the PA 101. Now, equation 5 should be revised by adding one new item:

$$b_1 = (S_{12} + \Gamma * e^{2j\varphi_1} + \Gamma_L * e^{2j\varphi_2}) * a_2 = (\Gamma' + \Gamma_L * e^{2j\varphi_2}) * a_2, \quad \text{(eq. 6)}$$

where $\Gamma_L$ is defined to be the voltage reflection coefficient at the impedance tuner, $\varphi_2$ is the phase shift of the signal that goes through both the circulator and the switch, and $\Gamma' = S_{12} + \Gamma * e^{2j\varphi_1}$ is the combination of the first two reverse signals, which is a fixed value for each product. Here, it is assumed that the loss of the switch is negligible, for the simplicity without losing generality. By tuning the magnitude and phase of $\Gamma_L$, $\Gamma_L * e^{2j\varphi_2}$ can be made to have similar magnitude and close to 180° phase difference with $\Gamma'$. Then the two can cancel each other and the total reflection can be reduced to a very low value. Note that for simplification of analysis, the reflection signal reflected by the port 1 (reflection 4 in FIG. 1) is not considered in the above analysis. But it does not influence the effectiveness of the analysis because both reflection 4 and $a_2$ are related to the forward transmit signal, $a_1$ and thus reflection 4 can be combined into $\Gamma'$ of equation 6.

Figure 4:
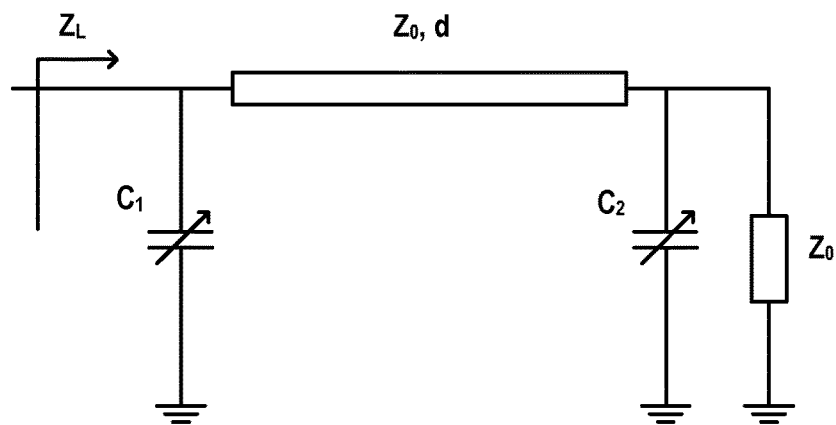
FIG. 4 is a diagram illustrating an impedance tuner usable in the embodiment.

As an exemplary example, the impedance tuner shown in FIG. 4 may be used. As shown, the impedance tuner comprises two voltage-controlled capacitors plus one section of transmission line. Here $Z_0$ is the characteristic impedance of the system (e.g. 50 ohm), d is the length of the transmission line between the two tunable capacitors and can be an arbitrary value. The detailed working principle of this kind of impedance tuner can be found from section 5.3 of "Microwave Engineering, fourth edition" (David M. Pozar). The benefit of this kind of impedance tuner is that any impedance within certain voltage standing wave ratio (VSWR) circle can be obtained by electrically tuning the value of the two capacitors, as analysed below.

To obtain $\Gamma_L = |\Gamma_L| e^{j\varphi}$ with arbitrary magnitude and phase at the input of this structure, the conductance can be defined as below:

$$Y_L = \frac{1}{Z_L} = G_L + jB_L. \quad \text{(eq. 7)}$$

The relation between $Y_L$ and $\Gamma_L$ is:

$$Y_L = \frac{1 - \Gamma_L}{1 - \Gamma_L} Y_0, \quad \text{(eq. 8)}$$

Where $$Y_0 = \frac{1}{Z_0}.$$

By substitute equation 8 into equation 7, the following result can be obtained:

$$G_L = Y_0 \frac{1 - |\Gamma_L|^2}{1 + 2|\Gamma_L|\cos\varphi + |\Gamma_L|^2}, \quad \text{(eq. 9)}$$

$$B_L = Y_0 \frac{-2|\Gamma_L|\sin\varphi}{1 + 2|\Gamma_L|\cos\varphi + |\Gamma_L|^2}.$$

Finally, using equations 5.22 and 5.23 in "Microwave Engineering, fourth edition" (David M. Pozar), the desired values of the capacitors can be obtained for target $\Gamma_L$ or $Z_L$:

$$C_1 = \frac{1}{\omega}\left(-B_L + \frac{Y_0 + \sqrt[2]{(1+t^2)G_L Y_0 - G_L^2 t}}{t}\right) \quad \text{(eq. 10)}$$

-continued $$C_2 = \frac{1}{\omega}\left(\frac{Y_0\sqrt{Y_0 G_L(1+t^2) - G_L^2 t^2} + G_L Y_0}{G_L t}\right),$$

where $t=\tan\beta d$ and $\theta=\beta d$ is defined to be the electric length of the transmission line. Note that the solution with a '+' sign is chosen in equation 5.22 and 5.23 since a capacitor has a positive susceptance.

The limitation of this structure is that $$G_L \geq Y_0 \frac{1+t^2}{t^2}$$

is not available, or equivalently speaking, by tuning the value of $C_1$ and $C_2$, any impedance within the circle of $$VSWR = \frac{1+t^2}{t^2}$$

in Smith chart is available. So, to have large tuning range for this kind of impedance tuner, the length of the transmission line should not be too long. On the other hand, it is clear from equation 10 that the desired values of capacitors are inversely proportional to d. So for practical application, a suitable value of d should be chosen. For example, if $d=\lambda/4$ is chosen, any wanted $\Gamma_L$ with VSWR less than 2 can be obtained.

Figure 5:
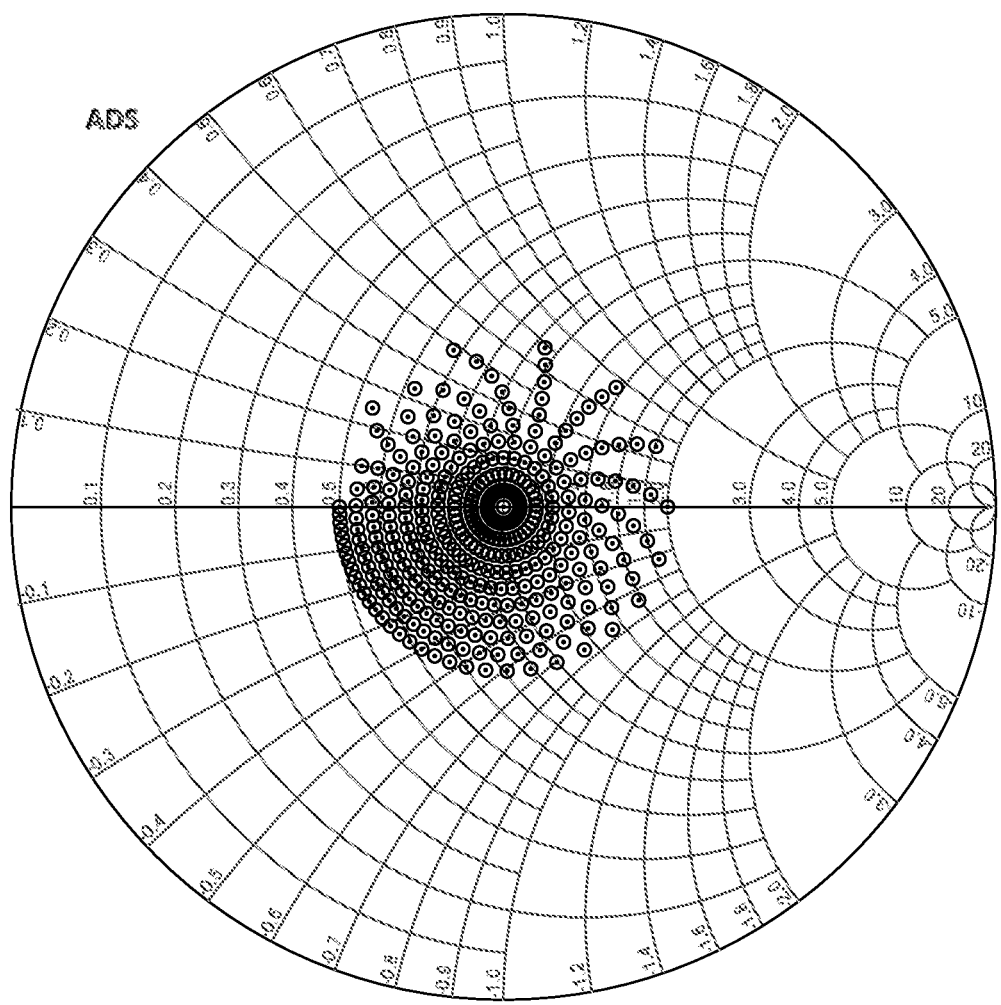
FIG. 5 is a Smith chart illustrating the simulated effect of the impedance tuner of FIG. 4.
Figure 6A:
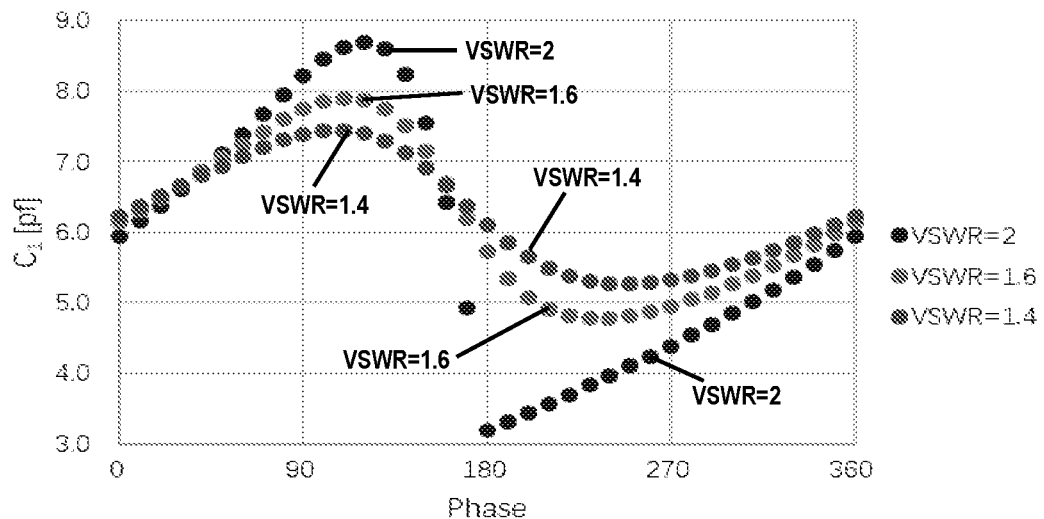
FIGS. 6A-6B are diagrams illustrating the values of two capacitors in the sweep of FIG. 5.
Figure 6B:
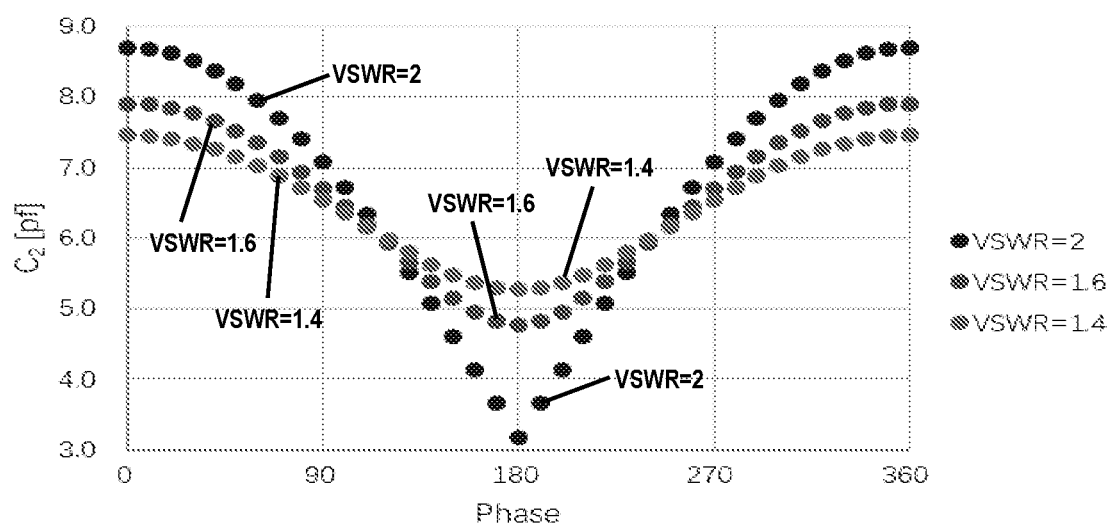

FIG. 5 is a Smith chart illustrating the simulated effect of the impedance tuner of FIG. 4. In the simulation, capacitor values of $C_1$ and $C_2$ were swept to traverse the impedance within the circle of VSWR=2. The frequency was 1 Ghz and $d=\lambda/4$. VSWR swept from 1 to 2 with 10 steps and the phase step=10°. The corresponding values of the two capacitors used in this sweep for $\Gamma_L$=2, 1.6, and 1.4 are shown in FIGS. 6A and 6B. It can be seen that by tuning the values of the capacitors in this structure, any wanted $\Gamma_L$ within the target VSWR circle can be obtained.

To verify the effect of the embodiment, the isolation performance will be compared between the traditional PA backend shown in FIG. 1 and the new PA backend shown in FIG. 3 by using simulation. The models of devices (the circulator and the switch) used in the simulation are listed below:
the switch: SKY12207-306LF, SKYWORKS, 0.9-4 GHz; and
the circulator: SKYFR-001163, SKYWORKS, 1.8-2.7 GHz.
In addition, 2635-2675 MHz (B41F) was chosen in the simulation for illustration. Note that although the parameters from manufactures were used for the modeling of the devices, the embodiment is generally applicable and is not limited to the detailed models of the devices.

Figure 7:
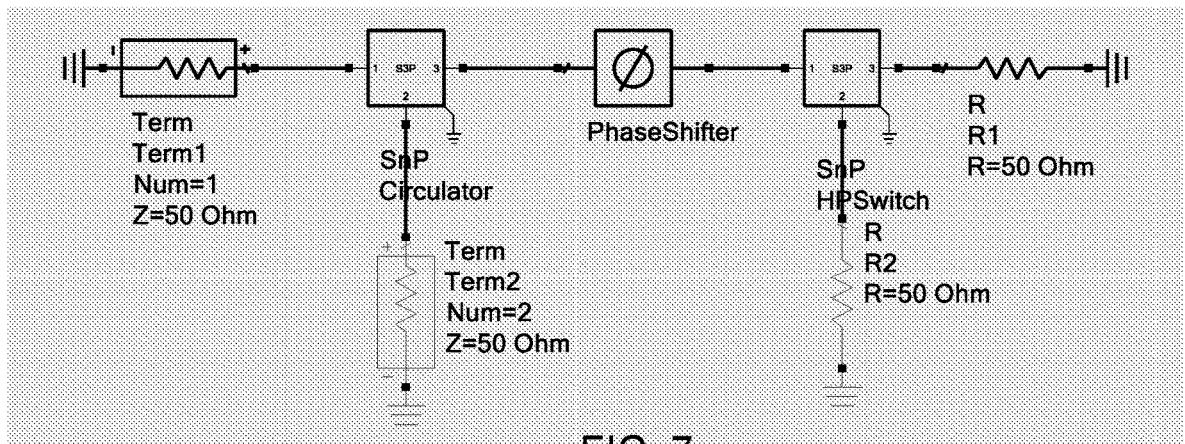
FIG. 7 is a diagram illustrating the traditional PA backend used for simulation.

FIG. 7 is a circuit diagram illustrating the traditional PA backend used in the simulation. For brevity, only the parts that impact isolation are shown, that is, a circulator, a HP switch, and a load. The port definition of the circulator and the HP switch is exactly the same as that in FIG. 1 and FIG. 3. That is, ports 1, 2, and 3 of the circulator are connected to the PA, the FU, and the HP switch during downlink TDD slot, respectively. Ports 1, 2, and 3 of the HP switch are connected to the circulator, the LNA (receiver (RX)), and the load during uplink TDD slot, respectively. It is assumed that port 2 of the HP switch is terminated since it has little impact on the isolation in the DL timeslot. One phase shifter was added between the circulator and the HP switch. In reality, its value depends on the device itself, the length of transmission line between the two, and the parasitic parameter induced by e.g. a printed circuit board (PCB), and is fully out of control. In frequency range 2635-2675 MHz, the isolation of the circulator (S12) is about −23 dB, and the return loss at the input port of the HP switch (S11) is about −20.5 dB.

Figure 8:
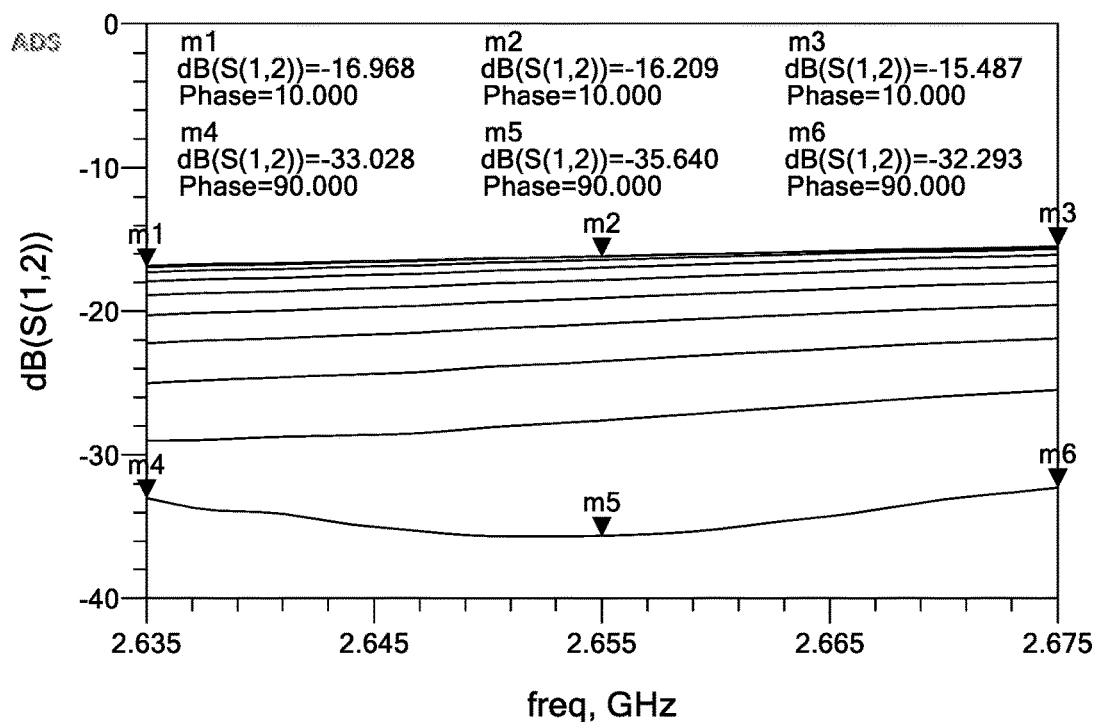
FIG. 8 is a diagram illustrating the simulated isolation performance versus phase in the traditional PA backend.

The isolation (S12) of the structure of FIG. 7 is shown in FIG. 8. In the simulation, the phase value of the phase shifter swept from 0 to 90°, with 10° steps. As can be seen, the phase has a big impact on the system isolation performance. Around 10°, the two terms in equation 5 are close to in-phase, so the addition of the two produces a bad isolation value, up to about −16 dB. Around 90°, the two terms are close to anti-phase, so they cancel each other, and the isolation is around −32 dB, which is better than the worst case by more than 16 dB. So, as mentioned above, the uncontrolled phase can have a big impact on the system isolation. Furthermore, if the imperfect matching and device variation is taken into account, the result could be even worse than what is shown in this simple simulation.

Figure 9:
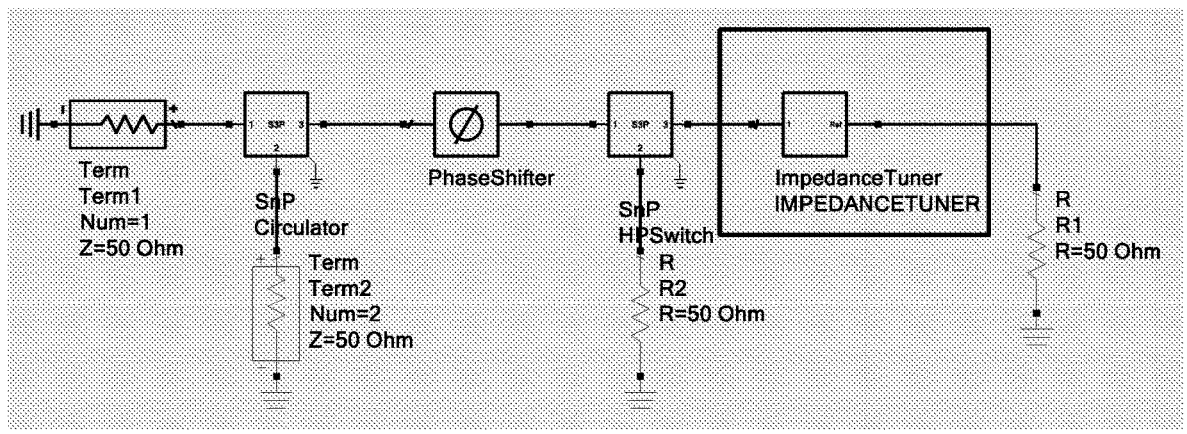
FIG. 9 is a diagram illustrating a PA backend of an embodiment used for simulation.
Figure 10:
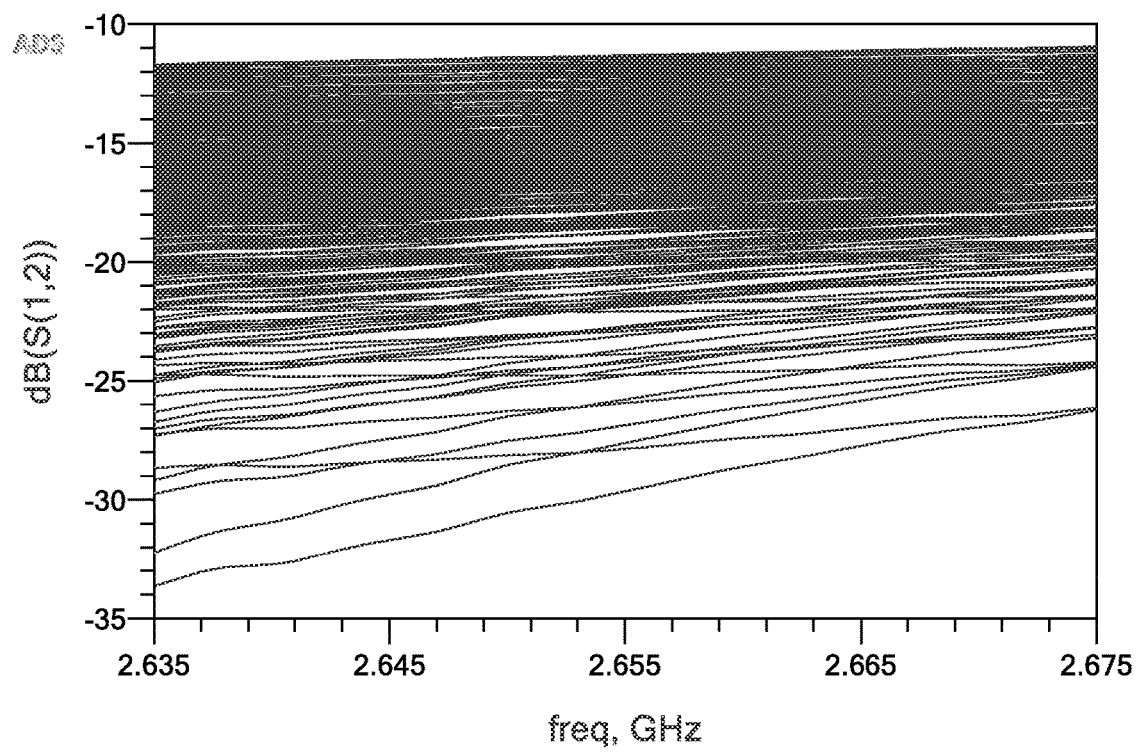
FIG. 10 is a diagram illustrating the simulated isolation performance of the embodiment.

FIG. 9 is a circuit diagram illustrating the PA backend of an embodiment used in the simulation. As shown, an impedance tuner is added between the HP switch and the load. In the simulation, the phase of the phase shifter was fixed to be 10° to produce the worst isolation, which is about −16 dB, as revealed in FIG. 8. This can make it clearer to observe the improvement of isolation with the embodiment. The simulation results of the isolation performance of the embodiment are shown in FIG. 10. As shown, the value of $\Gamma_L$, which is the voltage reflection at the input of the impedance tuner, was change to see the performance of isolation in the simulation. The magnitude of $\Gamma_L$ was swept from 0 to 0.15 with 10 steps and the phase of $\Gamma_L$ was swept from 0 to 360° with 10° steps. If −16 dB is taken as the baseline, it is evident that the isolation can be significantly improved in the new structure of the embodiment, by choosing proper parameters of the impedance tuner.

Figure 11:
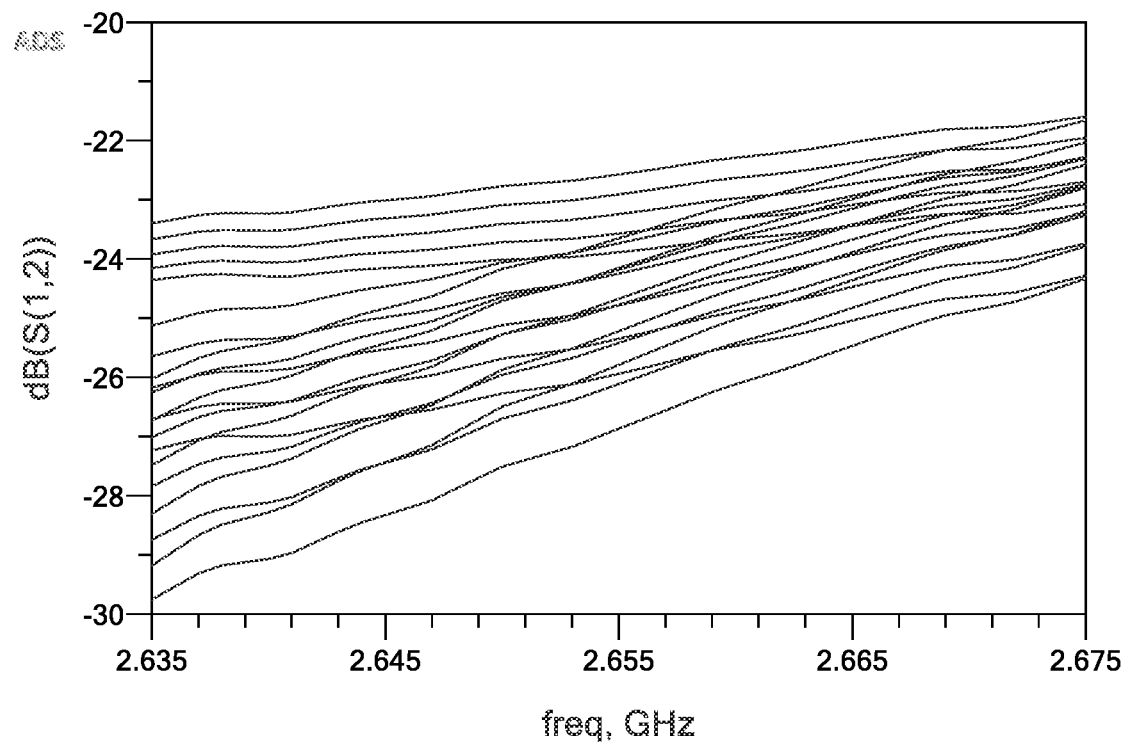
FIG. 11 is a diagram illustrating the simulated isolation performance of the embodiment.

FIG. 11 illustrates the isolation performance in the new structure of the embodiment. In the simulation, the sweep range was narrowed to the magnitude of $\Gamma_L$ from 0.115 to 0.135, with 0.005 steps, and the phase of $\Gamma_L$ from 150° to 180°, with 10° steps. As can be seen, for all the parameter settings within this range, this new structure has, at least 6 dB improvement on the system isolation performance. So, it is flexible to choose a desired impedance to improve the system isolation.

Figure 12:
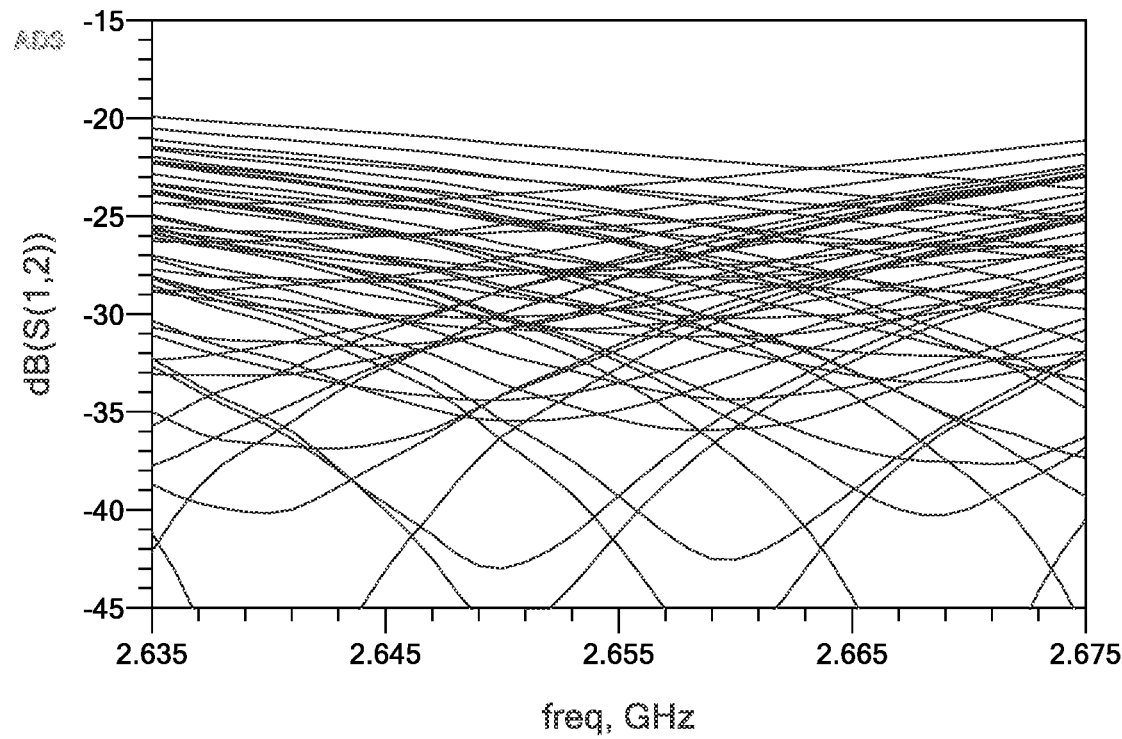
FIG. 12 is a diagram illustrating the simulated isolation performance of the embodiment.

FIG. 12 also illustrates the isolation performance in the new structure of the embodiment. The simulation results shown in FIG. 12 were obtained by using the specified structure of the impedance tuner shown in FIG. 4 where $d=\lambda/4$ was chosen. The value of $C_1$ was swept from 1.8 pf to 2.1 pf, with 0.05 pf steps, and the value of $C_2$ was swept from 1.7 pf to 2 pf, with 0.05 pf steps. It can be clearly seen that all the combinations of $C_1$ and $C_2$ within this range can improve system isolation.

Based on the above description, the new structure of the embodiment can significantly improve the isolation performance of a PA backend in a TDD system, mainly from two aspects. Firstly, it can improve the bad isolation caused by poor matching of devices (e.g. a HP switch) and by the in-phase addition of several reverse signals. Secondly, it can deal with the isolation issue caused by device/PCB variation, which often exists in reality, since the tuner can be calibrated electrically. Therefore, the linearity of a radio transmitter could be improved by this new structure.

Although the example of the impedance tuner shown in FIG. 4 has been described above for explaining the principle of the embodiment, it should be noted that various types of impedance tuners may be used. For instance, the impedance tuner may have a structure of single-stub or multi-stub. Examples of the tunable elements in a stub may include, but not limited to, a variable capacitor (e.g. a voltage-controlled capacitor, MEMS switched capacitor), a variable resistor, a varactor (e.g. a diode varactor), an MEMS switch, and the like.

Figure 13A:
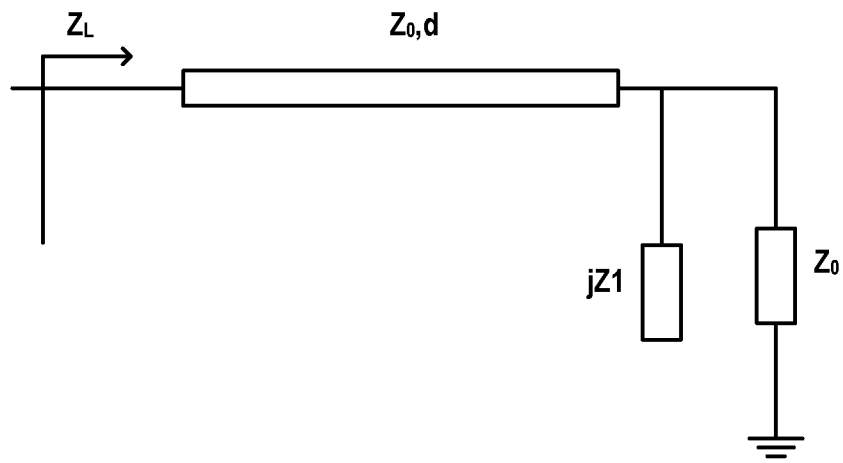
FIGS. 13A-13E are diagrams illustrating impedance tuners usable in the embodiment.
Figure 13B:
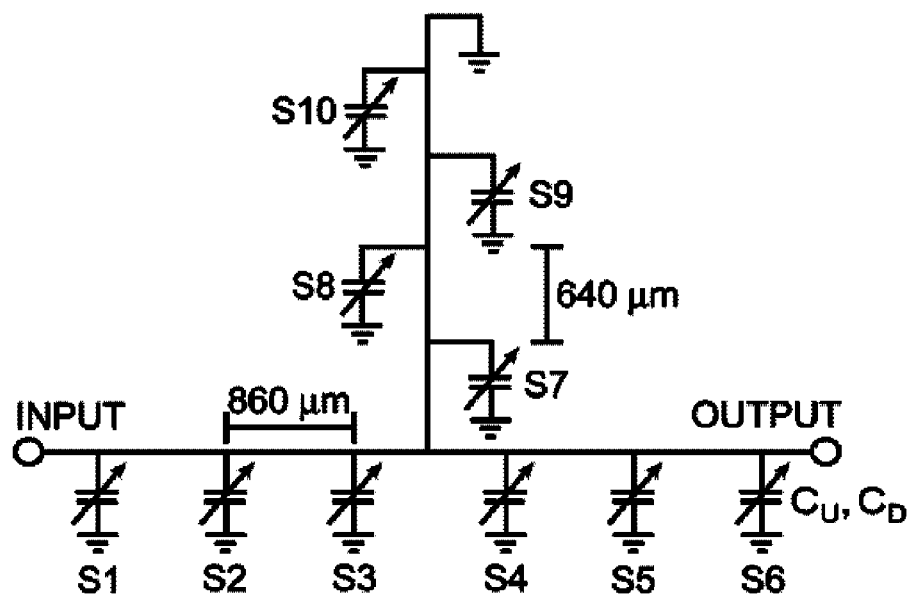
Figure 13C:
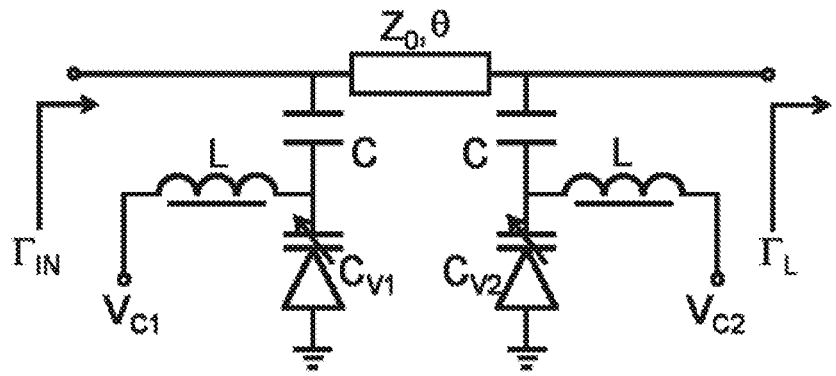
Figure 13D:
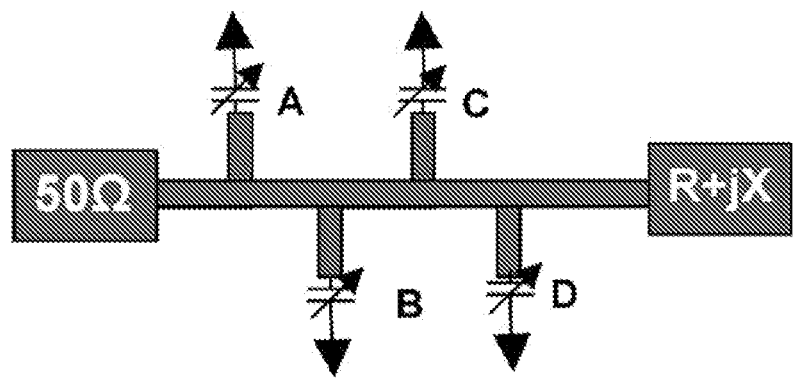
Figure 13E:
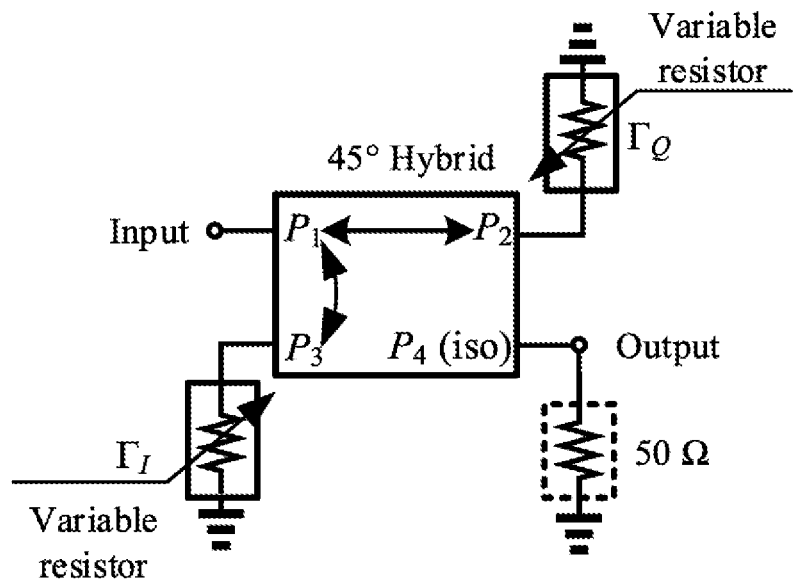

As a first exemplary example, instead of the double-stub impedance tuner shown in FIG. 4, a single-stub impedance tuner shown in FIG. 13A may be used. By tuning the distance from the load to the stub, as well as the value of susceptance or reactance of the stub, this kind of tuner can achieve any wanted impedance. The single-stub impedance tuner may also take the form shown in FIG. 13B. More details about the impedance tuner of FIG. 13B can be found from T. Vänä-Heikkilä, et al., "A 20-50 GHz RF MEMS Single-Stub Impedance Tuner" (IEEE Microwave and Wireless Components Letters, Vol. 15, No. 4, April, 2005). As a second exemplary example, a different double-stub impedance tuner shown in FIG. 13C may be used. More details about the impedance tuner of FIG. 13C can be found from R. Quaglia, et al., "A Double Stub Impedance Tuner with SiC Diode Varactors" (Proceedings of the Asia-Pacific Microwave Conference 2011). As a third exemplary example, a multi-stub impedance tuner shown in FIG. 13D may be used. More details about the impedance tuner of FIG. 13D can be found from Zhen Zhou, et al., "Frequency Agility of Broadband Antennas Integrated With a Reconfigurable RF Impedance Tuner" (IEEE Antennas And Wireless Propagation Letters, Vol. 6, 2007). As a fourth exemplary example, a coupler based impedance tuner which is formed (at least) with a hybrid coupler and variable (or tunable) element(s), such as that shown in FIG. 13E, may be used. More details about the impedance tuner of FIG. 13E can be found from Milad Kalantari, et al., "A Tunable Reflection/Transmission Coefficient Circuit Using a 45° Hybrid Coupler With Two Orthogonal Variables" (IEEE Transactions on Microwave Theory and Techniques, Vol. 67, No. 4, April, 2019). Note that besides the variable resistors, the variable elements can be implemented by variable capacitors, p-i-n diodes, MOSFET transistors biased in the triode region and digital potentiometers.

It should be also noted that the present disclosure is not limited to the above structure of the radio transmitter shown in FIG. 3. As another example, the antenna unit 108 may be an optional component of the radio transmitter 300 since some radio transmitter (e.g. an RRU) may not have an antenna unit. As yet another example, it is possible to omit the directional coupler 109 and the feedback path from the radio transmitter 300. In this case, the improved isolation brought by the impedance tuner can still benefit the performance of the power amplifier. As yet another example, it is possible to replace the impedance tuner with a passive impedance network of predetermined component values at the cost of certain loss of flexibility and isolation performance. For example, the radio transmitters manufactured in the same one batch may have basically the same characteristics of respective components. In this case, each of these radio transmitters manufactured in the same one batch may have the same passive impedance network of predetermined component values.

Based on the above description, at least one aspect of the disclosure provides a radio transmitter. The radio transmitter comprises a power amplifier, a filter unit, a circulator, a switch and a reflection cancellation unit. The filter unit is capable of filtering an output from the power amplifier during a downlink TDD slot and filtering an uplink signal during an uplink TDD slot. The circulator has a first port coupled to the power amplifier, a second port coupled to the filter unit, and a third port coupled to the switch. The switch is capable of coupling the third port of the circulator to a termination load during the downlink TDD slot and coupling the third port of the circulator to an uplink reception path during the uplink TDD slot. The reflection cancellation unit (e.g. the impedance tuner 307, or the passive impedance network mentioned above) is coupled between the switch and the termination load and is capable of generating a first reflection signal that propagates to the first port of the circulator via the switch and the third port of the circulator during the downlink TDD slot.

For example, at the first port of the circulator, the first reflection signal is added to a sum of reflection signals in order to offset the sum of reflection signals. The reflection signals offset by the first reflection signal (e.g. reflection 1 in FIG. 3) may comprise: a second reflection signal (e.g. reflection 2 in FIG. 3) leaked from the second port to the first port of the circulator, a third reflection signal (e.g. reflection 3 in FIG. 3) that is generated by the switch and propagates to the first port via the third port of the circulator, and a fourth reflection signal (e.g. reflection 4 in FIG. 3) that is generated or reflected by the first port of the circulator and propagates backward to the power amplifier.

Optionally, the radio transmitter may further comprise a directional coupler coupled between the power amplifier and the first port of the circulator, and a feedback receiver coupled to the directional coupler and configured to feed a portion of the output from the power amplifier back for digital pre-distortion. The feedback receiver can monitor the linearization performance of the power amplifier based on the received portion of the output from the power amplifier. Optionally, the radio transmitter may further comprise an antenna unit coupled to the filter unit. In this case, the second reflection signal may comprise a reflection signal (or backward wave) from the antenna unit. Note that the terms "reflection signal" and "backward wave" may be interchangeably used in the present disclosure, since a backward wave resulting from mutual coupling between different antenna units may also be deemed as a kind of reflection signal.

Figure 14:
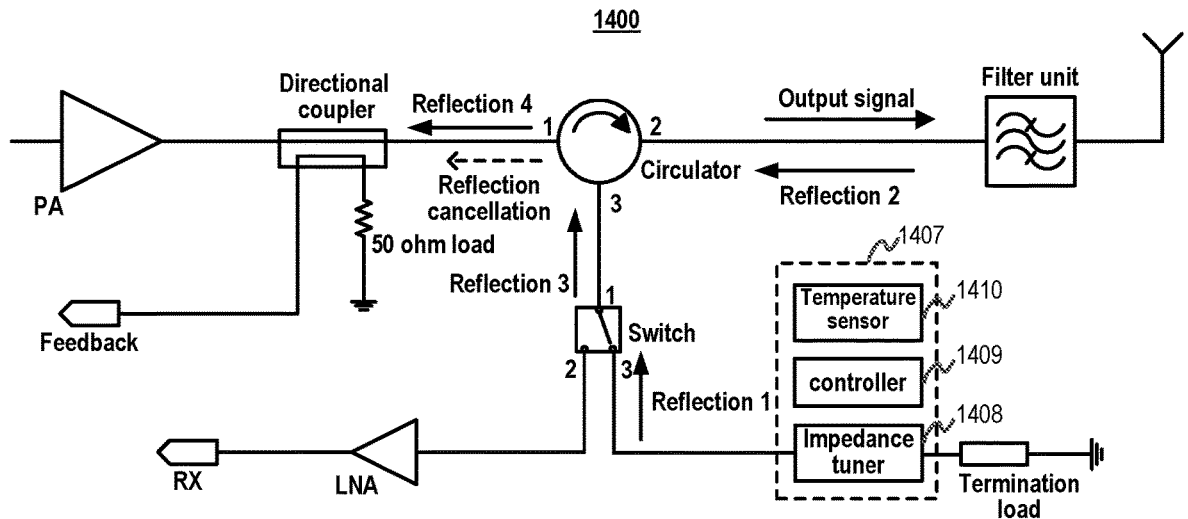
FIG. 14 is a diagram illustrating a radio transmitter according to another embodiment of the disclosure.

FIG. 14 is a diagram illustrating a radio transmitter according to another embodiment of the disclosure. As shown, the embodiment of FIG. 14 differs from the embodiment of FIG. 3 in that the reflection cancellation unit 307 which is the impedance tuner in FIG. 3 is replaced by a reflection cancellation unit 1407. As shown, the reflection cancellation unit 1407 comprises an impedance tuner 1408, a temperature sensor 1410 and a controller 1409. The temperature sensor 1410 may be configured to sense ambient temperature of the radio transmitter. The controller 1409 may be configured to control the impedance tuner based on the sensed ambient temperature, to minimize a total reflection at the first port of the circulator. For example, a look-up table may be prepared in advance during factory calibration, which indicates correspondences between different temperatures and different control values (e.g. control voltages for the impedance tuner) optimized under different temperatures. The look-up table may be used by the controller 1409 to determine the optimized control value for the impedance tuner according to the sensed ambient temperature. In this way, the variation of the components over temperature can be compensated in real time.

Figure 15:
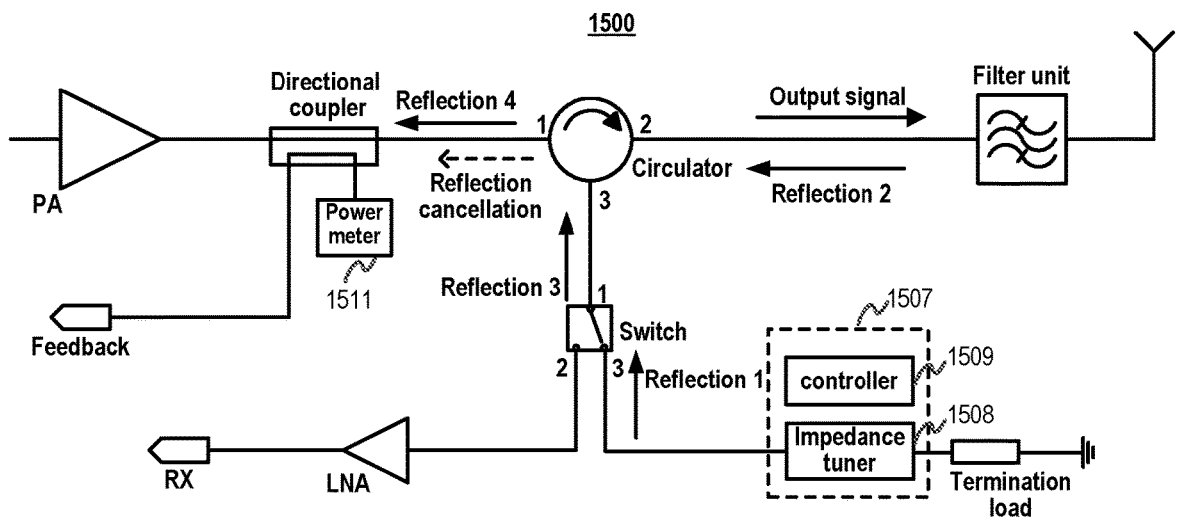
FIG. 15 is a diagram illustrating a radio transmitter according to another embodiment of the disclosure.

FIG. 15 is a diagram illustrating a radio transmitter according to another embodiment of the disclosure. As shown, the embodiment of FIG. 15 differs from the embodiment of FIG. 3 in that a power meter 1511 is additionally provided and the reflection cancellation unit 307 which is the impedance tuner in FIG. 3 is replaced by a reflection cancellation unit 1507. The power meter 1511 may be coupled between the first port of the circulator and the power amplifier and configured to measure a power of the total reflection at the first port of the circulator. As shown, the reflection cancellation unit 1507 comprises an impedance tuner 1508 and a controller 1509. The controller 1509 may be configured to control the impedance tuner to minimize the measured power of the total reflection.

Figure 16:
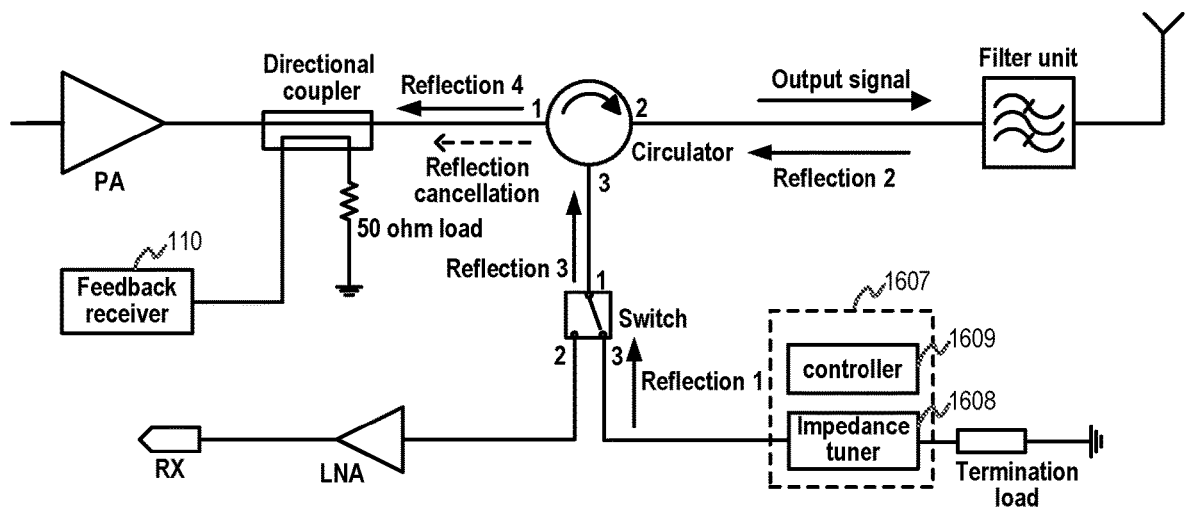
FIG. 16 is a diagram illustrating a radio transmitter according to another embodiment of the disclosure.

FIG. 16 is a diagram illustrating a radio transmitter according to another embodiment of the disclosure. As shown, the embodiment of FIG. 16 differs from the embodiment of FIG. 3 in that the reflection cancellation unit 307 which is the impedance tuner in FIG. 3 is replaced by a reflection cancellation unit 1607. Note that a feedback receiver 110, which is actually contained in the feedback path of FIG. 3 but is omitted for brevity, is clearly shown in FIG. 16. As described above, the feedback receiver 110 may be configured to monitor the linearization performance of the power amplifier. For example, the linearization performance of the power amplifier may be represented by at least one of ACLR and EVM of the forward travelling wave. As shown, the reflection cancellation unit 1607 comprises an impedance tuner 1608 and a controller 1609. The controller 1509 may be configured to control the impedance tuner to optimize the monitored linearization performance of the power amplifier. In the embodiments shown in FIG. 15 and FIG. 16, the optimized control values may be determined by the controller 1509/1609 by using one of a gradient decent process, a Levenberg Marquardt process, a Gauss-Newton process, a simultaneous perturbation stochastic approximation (SPSA) process, and any other similar processes, which will be described later with reference to FIG. 17.

Based on the above description, in at least one embodiment of the disclosure, the reflection cancellation unit may comprise a controller (e.g. the controller 1409/1509/1609) configured to control the impedance tuner to minimize the total reflection at the first port of the circulator.

Furthermore, at least one aspect of the present disclosure provides a radio device comprising the radio transmitter described above. Examples of the radio device may include, but not limited to, an RRU, a distributed unit (DU), an active antenna system (AAS), and a base station. The base station may be, for example, a node B (NodeB), an evolved NodeB (eNodeB or eNB), a next generation NodeB (gNodeB or gNB), a relay, an integrated access backhaul (IAB), a low power node such as a femto, a pico, and so forth. The other constituent parts of the radio device besides the radio transmitter may be well known in the art and their details are omitted here.

Figure 17:
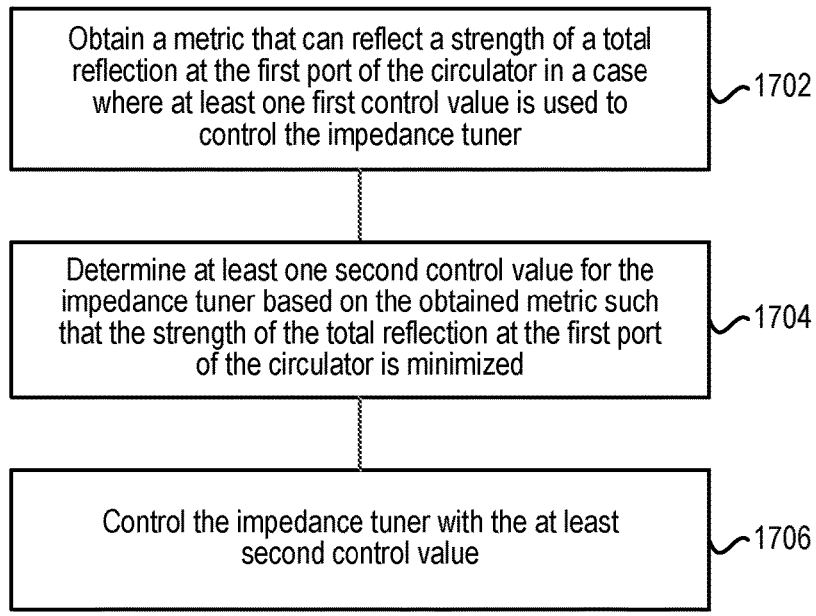
FIG. 17 is a flowchart illustrating a method performed by a controller according to an embodiment of the disclosure.

FIG. 17 is a flowchart illustrating a method performed by a controller according to an embodiment of the disclosure. The controller may be used in a radio transmitter which comprises a power amplifier, a filter unit, a circulator, a switch and an impedance tuner. The circulator has a first port coupled to the power amplifier, a second port coupled to the filter unit, and a third port coupled to the switch. The switch is capable of coupling the third port of the circulator to a termination load during a downlink TDD slot and coupling the third port of the circulator to an uplink reception path during an uplink TDD slot. The impedance tuner is coupled between the switch and the termination load and is capable of generating a first reflection signal that propagates to the first port of the circulator via the switch and the third port of the circulator during the downlink TDD slot.

At block 1702, the controller obtains a metric that can reflect a strength of a total reflection at the first port of the circulator in a case where at least one first control value is used to control the impedance tuner. For ease of understanding, an SPSA algorithm will be used below for explaining the method of FIG. 17. More details about the SPSA algorithm can be found from: for example, J. C. Spall and J. A. Cristion, "Model-free control of nonlinear stochastic systems with discrete-time measurements" (IEEE Transactions on Automatic Control, vol. 43, no. 9, pp. 1198-1210, September 1998). Suppose the impedance tuner is an n-stub impedance tuner. Then, in the case of the SPSA algorithm, the at least one first control value may be determined by the following steps. At the first step, the control values (e.g. control voltages for the impedance tuner) v1, v2, ..., vn are initialized. For example, the initialized control voltages may be those optimized before leaving the factory. At the second step, a random vector d1, d2, ... dn with bernoulli distribution is generated. At the third step, the at least one first control value may be determined to comprise: control voltages v1+d1, v2+d2, ..., vn+dn; and control voltages v1−d1, v2−d2, ..., vn−dn. Then, the two sets of control voltages may be applied to the impedance tuner respectively.

In order to evaluate the effect brought by the at least one control value (e.g. the two sets of control voltages), the metric may be the power of the total reflection at the first port of the circulator, which directly reflects the strength of the total reflection. The power of the total reflection may be measured by the power meter described above. Alternatively, the metric may be at least one of ACLR and EVM, which indirectly reflects the strength of the total reflection. The ACLR/EVM may be monitored by the feedback receiver described above. It is also possible to use a combination of the above two types of metrics.

At block 1704, the controller determines at least one second control value for the impedance tuner based on the obtained metric such that the strength of the total reflection at the first port of the circulator is minimized. In the case of the SPSA algorithm, the at least one second control value may be determined by the following steps. At the first step, a cost function cp may be evaluated based on the metric obtained under the control voltages v1+d1, v2+d2, ..., vn+dn. At the second step, a cost function cn may be evaluated based on the metric obtained under the control voltages v1−d1, v2−d2, ..., vn−dn. At the third step, the at least one second control value may be calculated as:

$$[v1, v2, \ldots, vn] = [v1, v2, \ldots, vn] - 0.5*(cp-cn)/[d1, d2, \ldots, dn].$$

At block 1706, the controller controls the impedance tuner with the at least one second control value. For example, the control voltages calculated at the above third step of block 1704 may be applied to the impedance tuner. Note that any other similar algorithm such as a gradient decent algorithm, a Levenberg Marquardt algorithm, a Gauss-Newton algorithm and the like may be used instead. Optionally, blocks 1702-1706 may be performed iteratively to control the impedance tuner in real time. It is also possible to use the method of FIG. 17 to handle the aging of the radio transmitter (this can be optimized after deployment, calibration once in a while or real-time tuning), and/or antenna/ cable reflections (this can be tuned after deployment, either once or real-time tracking since there may also be a temperature variation for cables).

It is also possible to use the method of FIG. 17 during factory calibration. For example, at block 1702, a signal generator may be used to generate a backward traveling wave to the second port of the circulator. Also suppose that the impedance tuner is an n-stub impedance tuner. Then, a set of initialized control voltages may be used as the at least one first control value to control the impedance tuner. The power of the backward traveling wave may be measured at the feedback path or power meter as the metric. At block 1704, the measured metric may be evaluated to calculate new control voltages (as the at least one second control value) to mitigate the power of the backward traveling. At block 1706, the new control voltages may be applied to the impedance tuner. In this way, process variation (component variation, soldering tolerance, etc.) can be optimized before leaving factories.

Figure 18:
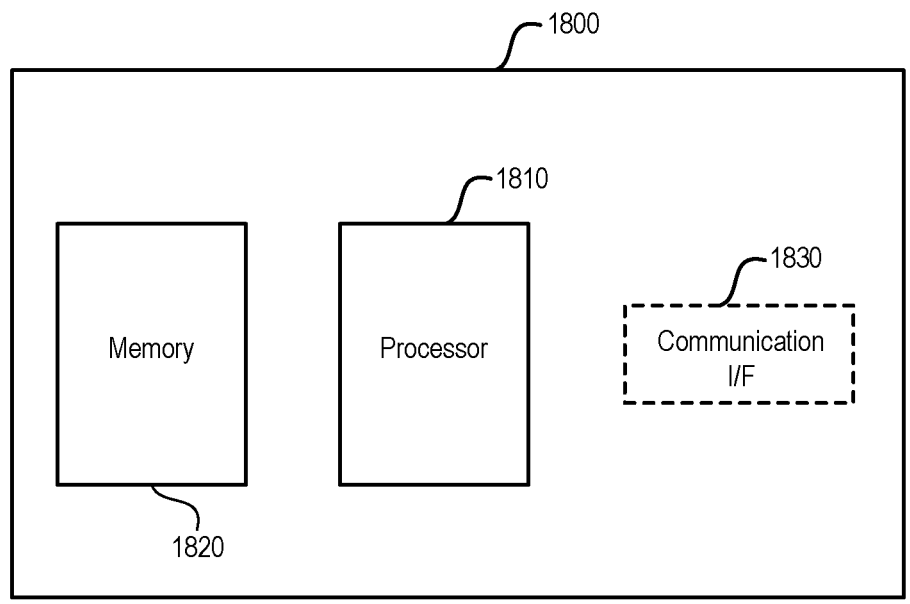
FIG. 18 is a block diagram showing an apparatus suitable for use in practicing some embodiments of the disclosure.

FIG. 18 is a block diagram showing an apparatus suitable for use in practicing some embodiments of the disclosure. For example, the controller described above may be implemented through the apparatus 1800. As shown, the apparatus 1800 may include a processor 1810, a memory 1820 that stores a program, and optionally a communication interface 1830 for communicating data with other external devices through wired and/or wireless communication.

The program includes program instructions that, when executed by the processor 1810, enable the apparatus 1800 to operate in accordance with the embodiments of the present disclosure, as discussed above. That is, the embodiments of the present disclosure may be implemented at least in part by computer software executable by the processor 1810, or by hardware, or by a combination of software and hardware.

The memory 1820 may be of any type suitable to the local technical environment and may be implemented using any suitable data storage technology, such as semiconductor based memory devices, flash memories, magnetic memory devices and systems, optical memory devices and systems, fixed memories and removable memories. The processor 1810 may be of any type suitable to the local technical environment, and may include one or more of general purpose computers, special purpose computers, microprocessors, digital signal processors (DSPs) and processors based on multi-core processor architectures, as non-limiting examples.

Figure 19:
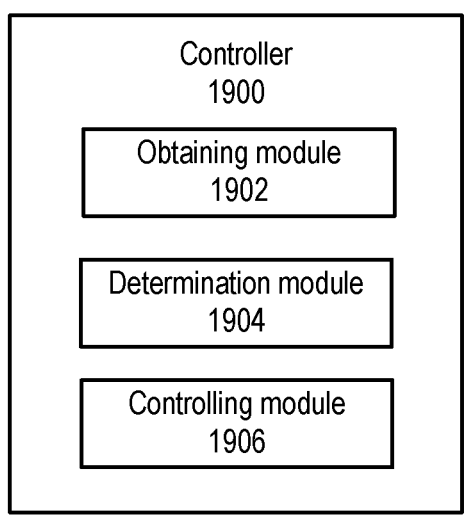
FIG. 19 is a block diagram showing a controller according to an embodiment of the disclosure.

FIG. 19 is a block diagram showing a controller according to an embodiment of the disclosure. The controller may be used in a radio transmitter which comprises a power amplifier, a filter unit, a circulator, a switch and an impedance tuner. The circulator has a first port coupled to the power amplifier, a second port coupled to the filter unit, and a third port coupled to the switch. The switch is capable of coupling the third port of the circulator to a termination load during a downlink TDD slot and coupling the third port of the circulator to an uplink reception path during an uplink TDD slot. The impedance tuner is coupled between the switch and the termination load and is capable of generating a first reflection signal that propagates to the first port of the circulator via the switch and the third port of the circulator during the downlink TDD slot.

As shown, the controller 1900 comprises an obtaining module 1902, a determination module 1904 and a controlling module 1906. The obtaining module 1902 may be configured to obtain a metric that can reflect a strength of a total reflection at the first port of the circulator in a case where at least one first control value is used to control the impedance tuner, as described above with respect to block 1702. The determination module 1904 may be configured to determine at least one second control value for the impedance tuner based on the obtained metric such that the strength of the total reflection at the first port of the circulator is minimized, as described above with respect to block 1702. The controlling module 1906 may be configured to control the impedance tuner with the at least one second control value, as described above with respect to block 1706. The modules described above may be implemented by hardware (e.g. field programmable gate arrays (FPGA), application specific integrated circuit (ASIC), etc.), or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A radio transmitter comprising:
   a power amplifier;
   a filter unit capable of filtering an output from the power amplifier during a downlink time division duplex (TDD) slot and filtering an uplink signal during an uplink TDD slot;
   a circulator having a first port coupled to the power amplifier, a second port coupled to the filter unit, and a third port coupled to a switch;
   the switch capable of coupling the third port of the circulator to a termination load during the downlink TDD slot and coupling the third port of the circulator to an uplink reception path during the uplink TDD slot; and
   a reflection cancellation unit which is coupled between the switch and the termination load and is capable of generating a first reflection signal that propagates to the first port of the circulator via the switch and the third port of the circulator during the downlink TDD slot.

2. The radio transmitter of claim 1, wherein the first reflection signal is added to a sum of reflection signals in order to offset the sum of reflection signals at the first port of the circulator.

3. The radio transmitter of claim 2, wherein the reflection signals offset by the first reflection signal comprise:
   a second reflection signal leaked from the second port to the first port of the circulator;
   a third reflection signal that is generated by the switch and propagates to the first port via the third port of the circulator; and
   a fourth reflection signal that is generated by the first port of the circulator and propagates backward to the power amplifier.

4. The radio transmitter claim 1, wherein the reflection cancellation unit is a passive impedance network of predetermined component values.

5. The radio transmitter claim 1, wherein the reflection cancellation unit comprises an impedance tuner.

6. The radio transmitter of claim 5, wherein the impedance tuner is:
   a single-stub impedance tuner;
   a multi-stub impedance tuner; of
   a coupler based impedance tuner which is formed with a hybrid coupler and tunable element(s).

7. The radio transmitter of claim 6, wherein one or more tunable elements in the single-stub impedance tuner or the multi-stub impedance tuner or the coupler based impedance tuner comprises:
   a variable capacitor;
   a variable resistor;
   a varactor; and/or
   a micro-electro-mechanical system, MEMS, switch.

8. The radio transmitter of claim 5, wherein the reflection cancellation unit further comprises:
   a controller configured to control the impedance tuner to minimize a total reflection at the first port of the circulator.

9. The radio transmitter of claim 8, wherein the reflection cancellation unit further comprises:
   a temperature sensor configured to sense ambient temperature of the radio transmitter, wherein
   the controller is configured to control the impedance tuner based on the sensed ambient temperature.

10. The radio transmitter of claim 9, wherein the impedance tuner is controlled by using a preconfigured look-up table indicating correspondences between control values for the impedance tuner and temperatures.

11. The radio transmitter of claim 8, wherein the reflection cancellation unit further comprises:
   a power meter that is coupled between the first port of the circulator and the power amplifier and configured to measure a power of the total reflection at the first port of the circulator, wherein
   the controller is configured to control the impedance tuner to minimize the measured power of the total reflection.

12. The radio transmitter of claim 11, the impedance tuner is controlled by using:
   a gradient decent process;
   a Levenberg Marquardt process;
   a Gauss-Newton process; or
   a simultaneous perturbation stochastic approximation (SPSA) process.

13. The radio transmitter of claim 1, further comprising:
   a directional coupler coupled between the power amplifier and the first port of the circulator; and
   a feedback receiver coupled to the directional coupler and configured to feed a portion of the output from the power amplifier back for digital pre-distortion.

14. The radio transmitter of claim 13, wherein the reflection cancellation unit further comprises:
   a controller configured to control the impedance tuner to optimize a linearization performance of the power amplifier monitored by the feedback receiver.

15. The radio transmitter of claim 14, wherein the linearization performance of the power amplifier is represented by:
adjacent channel leakage ratio; and/or
error vector magnitude.

16. The radio transmitter of claim 1, further comprising:
an antenna unit coupled to the filter unit.

17. A method performed by a controller in a radio transmitter, wherein the radio transmitter comprises a power amplifier; a filter unit; a circulator having a first port coupled to the power amplifier, a second port coupled to the filter unit, and a third port coupled to a switch; the switch capable of coupling the third port of the circulator to a termination load during a downlink time division duplex (TDD) slot and coupling the third port of the circulator to an uplink reception path during an uplink TDD slot; and an impedance tuner which is coupled between the switch and the termination load and is capable of generating a first reflection signal that propagates to the first port of the circulator via the switch and the third port of the circulator during the downlink TDD slot, the method comprising:
obtaining a metric that can reflect a strength of a total reflection at the first port of the circulator in a case where at least one first control value is used to control the impedance tuner;
determining at least one second control value for the impedance tuner based on the obtained metric such that the strength of the total reflection at the first port of the circulator is minimized; and
controlling the impedance tuner with the at least one second control value.

18. The method of claim 17, wherein the metric is one of:
a power of the total reflection at the first port of the circulator;
adjacent channel leakage ratio, ACLR; and
error vector magnitude, EVM.

19. The method of claim 17, wherein the at least one second control value is determined by using:
a gradient decent process;
a Levenberg Marquardt process;
a Gauss-Newton process; or
a simultaneous perturbation stochastic approximation process.

20. A controller in a radio transmitter, wherein the radio transmitter comprises a power amplifier; a filter unit; a circulator having a first port coupled to the power amplifier, a second port coupled to the filter unit, and a third port coupled to a switch; the switch capable of coupling the third port of the circulator to a termination load during a downlink time division duplex, (TDD) slot and coupling the third port of the circulator to an uplink reception path during an uplink TDD slot; and an impedance tuner which is coupled between the switch and the termination load and is capable of generating a first reflection signal that propagates to the first port of the circulator via the switch and the third port of the circulator during the downlink TDD slot, the controller comprising:
at least one processor; and
at least one memory, the at least one memory containing instructions executable by the at least one processor, whereby the controller is operative to:
obtain a metric that can reflect a strength of a total reflection at the first port of the circulator in a case where at least one first control value is used to control the impedance tuner;
determine at least one second control value for the impedance tuner based on the obtained metric such that the strength of the total reflection at the first port of the circulator is minimized; and
control the impedance tuner with the at least second control value.

* * * * *